Patented June 2, 1936

2,042,600

UNITED STATES PATENT OFFICE 2,042,600

ISOTHIOCYANATE SULPHONIC ACIDS

Josef Hilger, Leverkusen-I. G.-Werk, Anton Ossenbeck, Cologne-Mulheim, and Ernst Tietze, Cologne-on-the-Rhine, Germany, assignors to General Aniline Works, Inc., New York, N. Y., a corporation of Delaware No Drawing. Application June 29, 1933, Serial No. 678,310. In Germany July 23, 1932

9 Claims. (Cl. 260—99.10)

The present invention relates to a process of preparing isothiocyanate sulphonic acids and to the new compounds obtainable in accordance with said process. More particularly it relates to compounds which may be represented by the probable general formula:

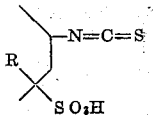

wherein

stands for an aromatic radical, for example, for a radical of the benzene-, naphthalene-, azobenzene-, pyridine- and carbazole-series.

In accordance with the present invention isothiocyanate sulphonic acids of the above identified formula are prepared by starting with an aromatic aminosulphonic acid, such as an aminobenzene sulphonic acid, an aminonaphthalene sulphonic acid, an aminoazobenzene sulphonic acid, an aminocarbazole sulphonic acid and an aminopyridine sulphonic acid, which starting compounds may bear further substituents, such as halogen, alkyl, alkoxy, hydroxy, the nitro group, a substituted amino group, such as the acetylamino- and benzoylamino-group and the like, and reacting upon the same in an aqueous mineral acid reacting medium at moderate temperature, say from about room temperature to about 50° C., with thiophosgene. A preferred method of carrying out our new process consists in working at temperatures between about 20 and about 30° C. with about equimolecular quantities of the two reacting components, or with a small excess of thiophosgene over the theoretical quantity required, say with an excess up to 10%.

The process may be illustrated by the following equation:

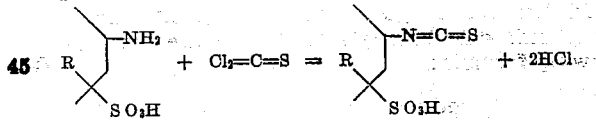

Instead of starting the process in a mineral acid reacting aqueous medium it may be started in a neutrally reacting aqueous medium, in this case the acid reaction being produced by the hydrochloric acid liberated in the reaction according to the above equation; we wish it to be understood that this method of carrying out our process falls within the scope of our invention.

In carrying out our new process it must be borne in mind that compounds containing in the positions ortho or para with respect to the amino group substituents giving rise to a ring closure by the action of thiophosgene, such as a free hyroxy group or the amino group, do not come into consideration for the purpose of our invention; these compounds, however, may be rendered suitable for our new process by transiently inactivating these substituents, for example by alkylating or esterifying in case of the hydroxy group, or acylating in case of the amino group.

The new isothiocyanate sulphonic acids are in the form of their alkali metal salts generally colorless crystalline substances. They are soluble in water, yielding solutions of high stability, and react with primary or secondary amines with the formation of symmetrical or asymmetrical thioureas, which thioureas can be transformed into ureas or guanidines according to methods known per se.

Our new isothiocyanate sulphonic acids are intended to find application for various technical purposes, for example, as intermediate products in the manufacture of dyestuffs and of synthetic drugs.

The invention is illustrated by the following examples, without being limited thereto:

*Example 1.*—26.1 parts by weight of the sodium salt of 2-amino-5-naphthol-7-sulphonic acid are dissolved in 800 parts by weight of water, and at 40° C. 12.5 parts by weight of thiophosgene are added while stirring. The free acid separating in the beginning of the process due to the hydrochloric acid liberated re-enters into solution in the course of one hour. When 2-amino-5-naphthol-7-sulphonic acid is no more detectable (eventually a further small quantity of thiophosgene must be added), the solution is filtered, and from the filtrate the new isothiocyanate having in its free state the following formula:

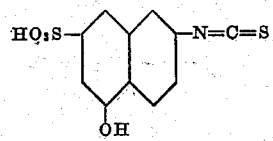

is salted out with common salt, filtered and dried. The sodium salt is thus obtained in form of colorless needles which are easily soluble in water. The yield is rather theoretical.

*Example 2.*—48.1 parts by weight of 4'-aminobenzoyl-1-amino-8-hydroxynaphthalene-3,6-disodium sulphonate are dissolved in 1000 parts by weight of water at 35° C. with the addition of some hydrochloric acid, and the solution is stirred, after adding 13 parts by weight of thiophosgene, for about 3 to 4 hours. In order to transform unchanged aminosulphonic acid into the isothiocyanate, after 2 hours 3 parts by weight of thiophosgene are added in small portions. The reaction is complete when a test portion after the addition of sodium nitrite no longer reacts with R-salt with the formation of a dyestuff. The isothiocyanate sulphonic acid having in its free state the following formula:

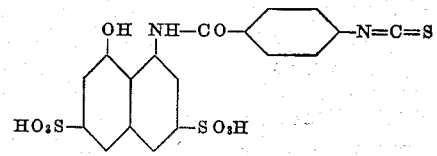

is salted out as sodium salt with the aid of sodium chloride and is obtained in the form of rather colorless flakes. The yield is quantitative.

Example 3.—70.1 parts by weight of the trisodium salt of 3''-aminobenzoyl-3'-amino-4'-methyl-1-benzoyl-1-naphthylamine-4.6.8-trisulphonic acid are dissolved in 280 parts by weight of water, and the solution is rendered acid by the addition of 10 parts by weight of hydrochloric acid of 19° Bé. At 35° C. 13 parts by weight of thiophosgene are added with well stirring. After 2 hours' stirring the amino compound is no longer detectable. The isothiocynate having in its free state the following formula:

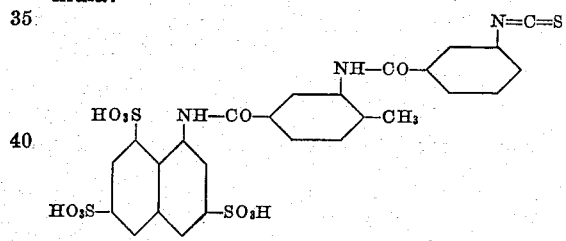

is salted out with sodium chloride as sodium salt.

In an analogous manner other mono- or di-aminoacylated derivatives of the sulfonic acids of α- or β-naphthylamine can be transformed into isothiocyanates.

Example 4.—51.7 parts by weight of the disodium salt of 1-amino-8-(p-toluenesulphonyl)hydroxynaphthalene - 3,6 - disulphonic acid are stirred for half an hour at 32° C. in 800 parts by weight of water, to which a small quantity of hydrochloric acid has been added with 13 parts by weight of thiophosgene. Then the reaction mixture is heated to 50° C. and, if necessary, 1 part by weight of thiophosgene is added for completing the reaction. The solution is then filtered, some unchanged thiophosgene is blown off with air, and the isothiocyanate sulphonic acid having in its free state the following formula:

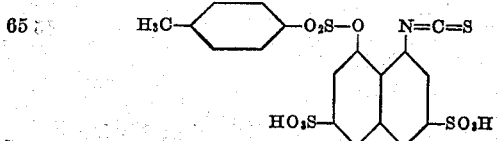

is salted out with potassium chloride. It is precipitated in an oily form and soon solidifies.

Example 5.—22.9 parts by weight of the sodium salt of 4-chloroaniline-3-sulphonic acid are dissolved in 300 parts by weight of water at 35° C. and stirred with 13 parts by weight of thiophosgene for 2 hours, until a test portion to which sodium nitrite has been added does no longer react with an alkaline aqueous R-salt solution with the formation of a dyestuff. After filtering the isothiocyanate sulphonic acid having in its free state the following formula:

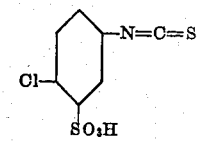

is salted out with potassium chloride and is obtained in form of white needles.

Example 6.—29.5 parts by weight of the sodium salt of 1-amino-anthracene-6-sulphonic acid are dissolved in 800 parts by weight of hot water and intensely stirred for 4 hours at 35–40° C. with 13 parts by weight of thiophosgene, until aminoanthracene-sulphonic acid is no longer detectable. The isothiocyanate sulphonic acid having in its free state the following formula:

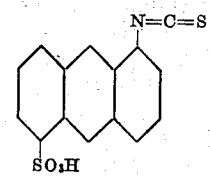

is rather difficultly soluble in water.

Example 7.—34.7 parts by weight of the disodium salt of 1-naphthylamine-3.6-disulphonic acid are dissolved in 300 parts by weight of water at 40° C., a small quantity of hydrochloric acid is added, 13 parts by weight of thiophosgene are introduced and the reaction mixture is stirred until aminosulphonic acid is no longer detectable. The isothiocyanate sulphonic acid having in its free state the following formula:

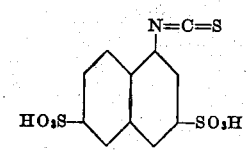

is isolated as sodium salt by the addition of common salt.

In an analogous manner there is prepared the isothiocyanate sulphonic acid from the 2-amino-8-naphthol-3.6-disulphonic acid having similar properties.

Example 8.—38 parts by weight of the disodium salt of 2-(3'-aminobenzoylamino)-benzene-4-sulphonic acid-1-carboxylic acid are stirred in 800 parts by weight of water at 35 to 40° C. with 13 parts by weight of thiophosgene. After 2 hours' stirring the reaction is complete. By the addition of common salt the new isothiocyanate sulphonic acid having in its free state the following formula:

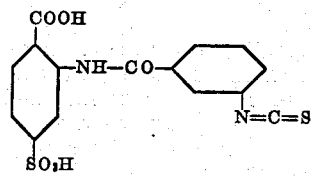

is salted out as sodium salt.

The isothiocyanate sulphonic acid can be condensed with other amino compounds to form thioureas in the solution as obtained according to this example.

Example 9.—621 parts by weight of the azodyestuff of diazotized 1.8-aminonaphthol-3,6-disulphonic acid, the hydroxy group of which is esterified with toluene-sulphochloride and 3-amino-4-cresolmethylether are dissolved in 2000 parts by weight of water to a neutrally reacting solution. After this at 30° C. 126 parts by weight of thiophosgene are introduced with stirring. After 4 to 5 hour's stirring the formation of the isothiocyanate sulphonic acid having in its free state the following formula:

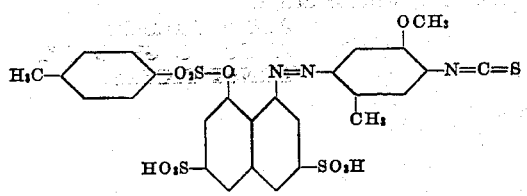

is complete. It is precipitated with common salt as a resinous mass, easily soluble in water.

Instead of the aminoazodyestuff used other suitable aminoazodyestuffs can be transformed into their isothiocyanates in the same manner, such as aminoazobenzene-disulphonic acid, the aminoazodyestuff from diazotized sulphanilic acid and 3-toluidine, and the like.

Example 10.—446 parts by weight of the disodium salt of dehydrothiotoluidine-disulphonic acid are dissolved in 5000 parts by weight of water, and thereto are added at 20 to 30° C. with well stirring 126 parts by weight of thiophosgene in small portions. After 4 hour's stirring the starting material can no more be detected. From the solution the isothiocyanate of the dehydrothiotoluidine-disulphonic acid having in its free state the following formula:

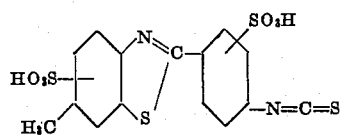

is salted out with sodium chloride in form of a colorless powder, which is easily soluble in water.

When starting with dehydrothiotoluidine-monosulphonic acid there is obtained an isothiocyanate which is more difficultly soluble in water.

Example 11.—211 parts by weight of 4-aminophenol-2-sulphonic acid (sodium salt) are dissolved in water and transformed into the isothiocyanate with 126 parts by weight of thiophosgene in an analogous manner as described in Example 10. The isothiocyanate having in its free state the following formula:

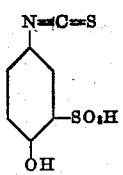

is easily soluble in water and can be separated from its aqueous solutions with the aid of common salt.

In an analogous manner there are prepared the isothiocyanates from 4-ethoxyaniline-2-sulphonic acid, from 2-anisidine-4-sulphonic acid, from 4-aminodiphenylether-2-sulphonic acid, from 3-aminophenol-4-sulphonic acid and the like compounds.

Example 12.—196 parts by weight of the sodium salt of 2-aminopyridine-5-sulphonic acid are dissolved in 2000 parts by weight of water and thereto are added while well stirring at 25° C. 126 parts by weight of thiophosgene. After 2 hour's stirring aminopyridinesulphonic acid is no more detectable. The solution is filtered, and from the filtrate the isothiocyanate sulphonic acid having in its free state the following formula:

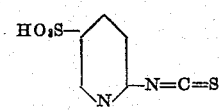

is salted out with common salt.

We claim:

1. The process which comprises causing thiophosgene to react upon a compound of the group consisting of aromatic aminosulphonic acids in an aqueous mineral acid medium at temperatures between about 15 and 50° C.

2. The process which comprises causing thiophosgene to react upon a compound of the group consisting of cyclic aminosulphonic acids of the benzene and naphthalene series in an aqueous mineral acid medium at temperatures between about 15 and about 50° C.

3. Process as claimed in claim 1 in which the two components are caused to react upon each other in about equimolecular quantities.

4. Process as claimed in claim 2 in which the two components are caused to react upon each other in about equimolecular quantities.

5. The process which comprises causing about equimolecular quantities of an aminohydroxynaphthalenesulphonic acid in which the hydroxy group may be esterified and thiophosgene to react upon each other at temperatures between about 15 and about 50° C in an aqueous mineral acid medium.

6. The process which comprises causing about equimolecular quantities of 3''-aminobenzoyl-3'-amino-4'-methyl-1-benzoyl-1-naphthylamine-4.6.8-tri-sodiumsulphonate and thiophosgene to react upon each other at about 35° C. in dilute aqueous hydrochloric acid.

7. Isothiocyanate sulphonic acids of the general formula:

wherein

R)

stands for an aromatic radical, being in form of their alkali metal salts generally colorless, crystalline substances, soluble in water and being valuable intermediate products in the manufacture of dyestuffs and synthetic drugs.

8. Isothiocyanate sulphonic acids of the general formula:

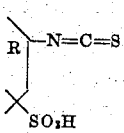

wherein

stands for a radical of the benzene or naphthalene series, being in form of their alkali metal salts generally colorless, crystalline substances, soluble in water and being valuable intermediate products in the manufacture of dyestuffs and synthetic drugs.

9. The isothiocyanate sulphonic acid of the following formula:

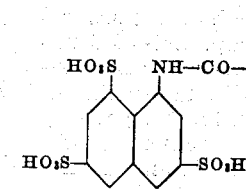

being in form of its alkali metal salts a colorless crystalline substance, soluble in water and being a valuable intermediate product in the manufacture of synthetic drugs.

JOSEF HILGER.
ANTON OSSENBECK.
ERNST TIETZE.